(12) United States Patent
Schuster

(10) Patent No.: US 10,131,448 B2
(45) Date of Patent: Nov. 20, 2018

(54) COUPLING MODULE FOR FORMING AN INTERFACE BETWEEN THE CABIN OF A PASSENGER BRIDGE AND AN AIRPLANE

(71) Applicant: Hübner GmbH & Co. KG, Kassel (DE)

(72) Inventor: Heinz Schuster, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 15/795,603

(22) Filed: Oct. 27, 2017

(65) Prior Publication Data

US 2018/0118373 A1    May 3, 2018

(30) Foreign Application Priority Data

Oct. 28, 2016 (EP) ..................................... 16196300

(51) Int. Cl.
*B64F 1/305* (2006.01)
*E01D 15/00* (2006.01)
*E01D 18/00* (2006.01)

(52) U.S. Cl.
CPC .......... *B64F 1/3055* (2013.01); *E01D 15/005* (2013.01); *E01D 18/00* (2013.01)

(58) Field of Classification Search
CPC ........ B64F 1/305; E01D 18/00; E01D 15/005

USPC .................................................. 14/69.5, 71.5
See application file for complete search history.

(56) References Cited

U.S. PATENT DOCUMENTS

| 3,693,204 | A | * | 9/1972 | Eggert, Jr. .............. | B64F 1/305 135/161 |
| 4,553,720 | A | * | 11/1985 | Harder ................... | B64F 1/3055 14/71.5 |
| 4,559,660 | A | | 12/1985 | Lichti | |
| 7,596,826 | B2 | * | 10/2009 | Anderberg .............. | B64F 1/305 14/69.5 |
| 8,429,780 | B2 | | 4/2013 | Scharf et al. | |

FOREIGN PATENT DOCUMENTS

| EP | 2397411 B1 | 8/2012 |
| EP | 2987730 A1 | 2/2016 |

* cited by examiner

*Primary Examiner* — Raymond W Addie
(74) *Attorney, Agent, or Firm* — Dinsmore & Shohl LLP

(57) ABSTRACT

A coupling module forms an interface between a cabin of a passenger bridge and an aircraft. The coupling module has a projecting roof and a floor arrangement overspanned by the projecting roof. The floor arrangement is pivotable about a horizontal pivot axis relative to the cabin. At least the floor arrangement and the projecting roof have a common pivot axis that is arranged in or beneath the floor arrangement, with the floor arrangement at least indirectly and substantially supporting the projecting roof.

11 Claims, 5 Drawing Sheets

COUPLING MODULE FOR FORMING AN INTERFACE BETWEEN THE CABIN OF A PASSENGER BRIDGE AND AN AIRPLANE

CROSS REFERENCE TO RELATED APPLICATIONS

This application claims priority from European Application No. EP16196300.4 filed Oct. 28, 2016, the entire content of which is incorporated herein by reference.

FIELD OF THE INVENTION

The invention relates to a coupling module to form an interface between the cabin of a passenger bridge and an aircraft, wherein the coupling module has a projecting roof and a floor arrangement overspanned by the projecting roof and wherein the floor arrangement is pivotable about a horizontal pivot axis relative to the cabin.

BACKGROUND OF THE INVENTION

Passenger bridges are sufficiently known from the prior art. They serve the transition for persons from the aircraft directly into the airport building. Since the access to the airport building is frequently arranged higher than the door opening of the aircraft, the aircraft bridges, which are held by a traveling mechanism at the front, movable end, frequently extend at a downward slope in the direction toward the door opening of the aircraft.

At the lower end of the passenger bridge, it has a cabin that is pivotable about a vertical axis, with the coupling module for the transition from the cabin into the aircraft being arranged at the front end at the cabin.

To match the coupling module to the door opening of the aircraft, it can be pivoted at the cabin of the passenger bridge. U.S. Pat. No. 4,559,660 A shows a cabin pivotable about a vertical axis.

It is furthermore known to pivot the floor arrangement about a horizontally extending axis, as disclosed by EP 2 397 411 B1. It is proposed therein that the coupling module, and thus also the floor arrangement, is held by the cabin of the passenger bridge pivotable about a horizontally extending longitudinal center axis. The longitudinal center axis here extends substantially centrally through the opening in the coupling module that extends between the floor arrangement and the projecting roof. In so doing, for example, the longitudinal center axis approximately passes through the center of an area overspanned by the projecting roof and the floor arrangement.

Arcuate rail sections and a plurality of rollers that can roll along the arcuate rail sections serve the supporting reception of the coupling module at the cabin. The arcuate rail sections extend in this respect about the longitudinal center axis for pivoting the coupling module. The floor arrangement is thereby held in a supporting manner at the frame of the coupling module so that the frame has to have a correspondingly loadable design, in particular when the weight of the floor arrangement and the weight of, for example, persons or objects that are standing on the floor arrangement also have to be taken up via the frame.

A lateral projection arises between the cabin and the floor arrangement of the coupling module due to the lateral movement in the floor arrangement that results on a pivot movement of the coupling module about a longitudinal center axis lying above the floor arrangement. A corresponding gap has to be closed in a complex manner using corresponding surface bodies, for example wave bellows. A lateral and vertical projection that can form tripping points for passengers can furthermore arise due to the pivoting of the floor arrangement relative to the floor arrangement of the cabin. The construction design of the supporting reception of the coupling module at the cabin of the passenger bridge by means of the arcuate rail sections and by means of rollers is furthermore complex and the floor arrangement experiences, in a manner of speaking, a suspended arrangement at the frame of the coupling module. To ensure a corresponding load capacity of the floor arrangement, the coupling module has to be designed with a supporting structure.

SUMMARY OF THE INVENTION

The object of the invention is the further development of a coupling module to form an interface between the cabin of a passenger bridge and an aircraft in which an improved movement of the floor arrangement is created on a pivoting of the coupling module at the cabin, wherein the design of the coupling module and the arrangement of the coupling module at the cabin should be further simplified.

This object may be achieved starting from a coupling module in accordance with the description herein, in conjunction with the characterizing features. Advantageous further developments of the invention are also set forth herein.

Embodiments of the invention include the technical teaching that at least the floor arrangement and the projecting roof have a common pivot axis that is arranged in or beneath the floor arrangement, wherein the floor arrangement at least indirectly and substantially supports the projecting roof.

A key idea of the invention is the mechanical simplification of the design of the coupling module, wherein a pendulum frame is, for example, also covered and is co-supported by the floor arrangement. The floor arrangement can be fastened to the cabin in a correspondingly loadable manner by means of the design in accordance with the invention, with the pivotability of the floor arrangement at the cabin being maintained. The floor arrangement is thus no longer suspended by the projecting roof or at its pendulum frame; the invention rather provides the advantage that the projecting roof and, for example, also the pendulum frame, so-to-say stand on the floor arrangement, that is they are arranged indirectly or even directly. A substantial advantage can be seen in the fact that a relative positional change between the floor arrangement and the projecting roof no longer results and a fixed arrangement of the projecting roof at the floor arrangement can be provided.

Provision is in particular made in accordance with the invention that the coupling module has a support body that is arranged in or beneath the floor arrangement, wherein at least the floor arrangement and the projecting roof are received in a supporting manner at the support body and are pivotable about a pivot axis thereat.

The arrangement of the coupling module at the cabin by means of a support body is in this respect provided such that the latter is arranged substantially beneath the coupling module, that is at least beneath the floor arrangement, but in particular beneath the walkable plane of the floor arrangement of the coupling module. If the coupling module pivots at the cabin of the passenger bridge, the floor arrangement consequently carries out a rocking movement without pivoting laterally in so doing since in accordance with the invention at least the floor arrangement and the projecting roof have a common pivot axis that is arranged in or beneath the floor arrangement. In comparison with the previous arrangement of the coupling module at the cabin in which the pivot axis extends centrally in the passage, the swinging motion of the floor arrangement on a pivoting of the coupling module is avoided since in accordance with the invention the pivot axis extends in or beneath the floor arrangement and the floor arrangement only carries out a rocking movement about the pivot axis that lies in or beneath the floor arrangement. Complex connection means between a pendulum frame of the coupling module and a base frame of the cabin of the passenger bridge are dispensed with by the simple design of the support body.

The support body here substantially completely takes up the weight of the coupling module, with the coupling module comprising the floor arrangement and the projecting roof as the main components. The coupling module can moreover comprise further components, for example a supporting frame, a pendulum frame and a device to be able to extend the projecting roof in the direction toward the aircraft.

The support body here extends beneath the cabin such that the support body can be arranged at the cabin for receiving the substantial weight forces of the coupling module. The support body so-to-say engages beneath the floor arrangement of the coupling module and the floor arrangement of the coupling module is received in a tilt-movable manner about the pivot axis. If the inclination of the passenger bridge has to be changed, the floor arrangement of the coupling module finally has to be returned to the horizontal position. The floor arrangement and consequently at least also the projecting roof of the coupling module can thus be pivoted in or beneath the floor arrangement of the coupling module to reestablish the horizontal position of the floor arrangement of the coupling module.

It is furthermore advantageous that the coupling module has a support body that is arranged in or beneath the floor arrangement, wherein at least the floor arrangement and the projecting roof are received in an at least indirectly supporting manner at the support body and are pivotable about the pivot axis thereat. The construction effort of the coupling module is thereby reduced since the coupling module is pivotable as a whole without a suspended arrangement of the coupling module at the front face of the cabin being necessary.

A particular advantage is achieved when the support body is arranged centrally beneath the floor arrangement viewed in the transverse direction and with the pivot axis extending perpendicular to the transverse direction and being arranged beneath the walkable surface of the floor arrangement. The transverse direction here forms the direction that extends substantially in parallel with the longitudinal aircraft axis when the passenger bridge with the cabin and the coupling module is laterally arranged at the aircraft. The floor arrangement of the coupling module is of a substantially elongate design, with the elongate extent of the floor arrangement extending in a transverse direction. In contrast, the pivot axis runs in a direction that is arranged perpendicular to the transverse direction so that the floor arrangement can pivot about the pivot axis, with the oppositely disposed outer end sides of the floor device of the coupling module rising and falling by a respective equal amount when the pivot axis is arranged centrally in or beneath the floor arrangement and when the coupling module pivots.

A further advantage is achieved when respective end side supports by which the outer end sides of the floor sides of the floor arrangement are lift-movably connected are formed beneath the floor arrangement at the outer end sides of the floor arrangement disposed in the transverse direction. Provision is in particular made that the floor arrangement with the projecting roof forms a rocking arrangement by means of the central support at the support body so that on a pivoting of the floor arrangement the height of the first outer end side of the floor arrangement increases over the first end side support and the height of the second outer end side of the floor arrangement decreases in the same manner over the oppositely disposed second end side support, and vice versa.

At least one mechanical connection element is further advantageously arranged between the outer end sides of the floor arrangement and the end side supports. The two end side supports serve to support the mechanical connection elements for the pivoting of the floor arrangement, with the connection elements not serving the taking up of the main working load of the coupling module. The end side supports rather serve to initiate a pivot movement of the coupling module, with asymmetrical loads about the pivot axis being able to be taken up by the end side supports.

At least one pivot drive is, for example, provided with which the mechanical connection elements between the outer end sides of the floor arrangement and the end side supports can be controlled and/or actuated. If the coupling module, and thus the floor arrangement, are to be pivoted in a first direction about the pivot axis, the pivot drive can be activated and the mechanical connection elements press one side of the floor arrangement away from the end side supports, and at the oppositely disposed side the outer end side of the floor arrangement approaches the end side support that, for example, is disposed thereunder. If the floor arrangement is to be pivoted in an opposite direction about the pivot axis, the direction of rotation of the pivot drive is reversed and the mechanical connection elements are controlled in the opposite direction, with the pivot forces of the floor being supported via the end side supports. The pivot drive is, for example, connected to the mechanical connection elements by means of coupling elements, with the coupling elements, for example, being configured as pull rods and/or push rods and/or as torsion rods. If, for example, a single pivot drive or a plurality of pivot drives is/are located centrally beneath the floor arrangement, for example in an arrangement at the support body, coupling elements that are movable by the pivot drive can extend at both sides and the mechanical connection elements on the oppositely disposed outer end sides of the floor arrangement are controlled in the respective opposite direction.

To further simplify the coupling module in accordance with the invention, the projecting roof is received on a pendulum frame that is essentially arrangeable in front of a base frame of the cabin of the passenger bridge, and with the pendulum frame being co-pivotable on a pivoting of the coupling module in a plane-parallel manner in front of the base frame. The projecting roof can be moved away from the pendulum frame for extension at the upper side; if the projecting roof is retracted again, it is again drawn toward the pendulum frame. The pendulum frame can here extend approximately perpendicular to the floor arrangement of the coupling module. The pendulum frame in particular terminates with the floor arrangement of the coupling module at the side that faces toward the cabin of the passenger bridge.

To stiffen the coupling module, in particular at least one supporting frame is provided with which the pendulum frame is supported at the floor arrangement so that the pendulum frame is rigidly arranged at the floor arrangement by means of the supporting frame. Respective supporting frames that rigidly connect the pendulum frame to the floor arrangement are, for example, located in the outer end sides of the floor arrangement.

At least one flexible surface body is further advantageously arranged between the pendulum frame and the base frame. The flexible surface body can, for example, comprise a wave bellows, wherein a single wave of a corresponding surface body can already be sufficient. A gap opening between the pendulum frame and the base frame is thus closed, with the wave being dimensioned such that the pendulum movement of the pendulum frame, caused by the pivoting of the coupling module, is freely movable before the substantially stationary base frame.

BRIEF DESCRIPTION OF THE SEVERAL VIEWS OF THE DRAWINGS

Further measures improving the invention will be shown in more detail below together with the description of a preferred embodiment of the invention with reference to the Figures. There is shown.

DETAILED DESCRIPTION OF THE INVENTION

Figure 1:
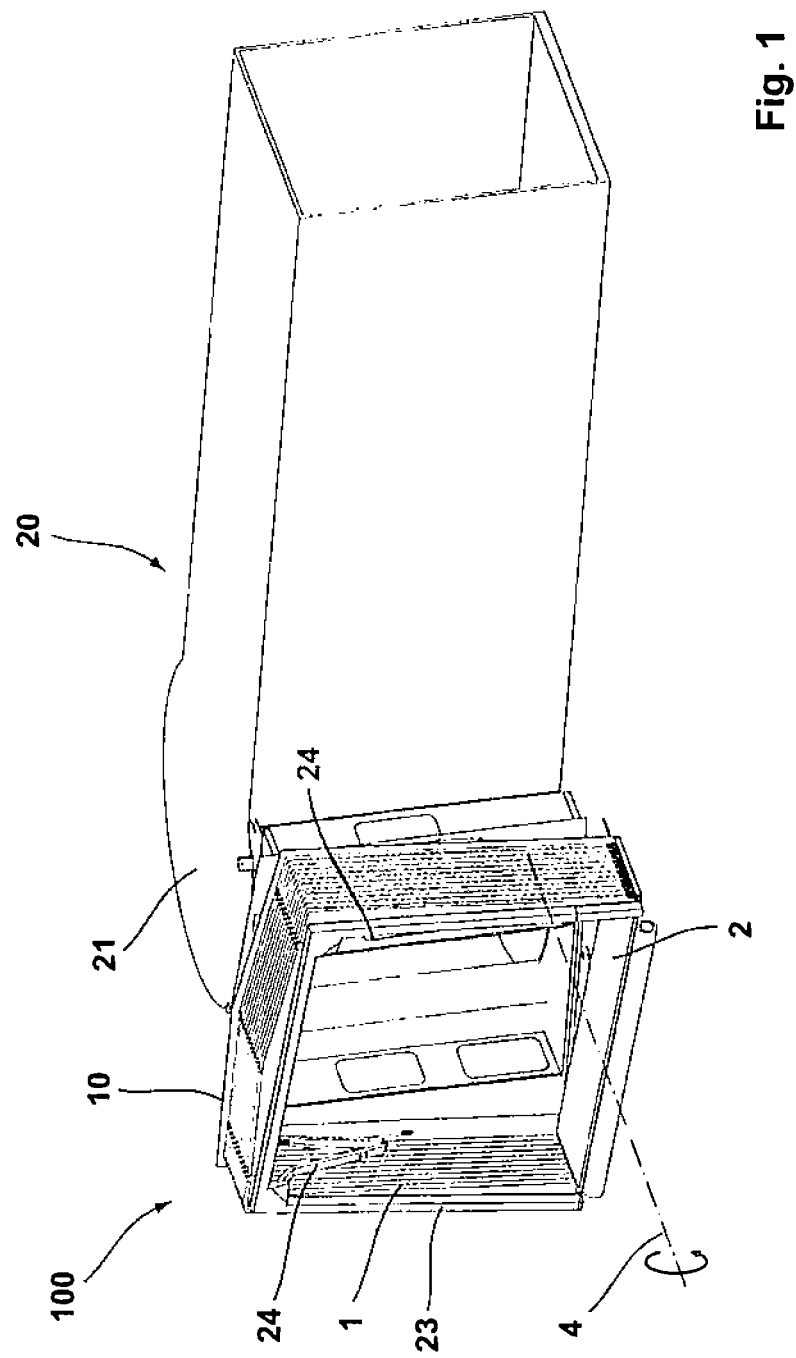
FIG. 1 is a perspective view of a passenger bridge with a coupling module arranged at a cabin of the passenger bridge.

FIG. 1 shows a coupling module 100 in an arrangement at a passenger bridge 20. A cabin 21 that is a component of the passenger bridge 20 is arranged at a front end of the passenger bridge 20 facing the aircraft. The coupling module 100 is arranged pivotably about an imaginary horizontal pivot axis 4 at the cabin 21. The coupling module 100 has a frame at its free side that is arranged at a projecting roof 1 and that can be arranged to contact the outer skin of the aircraft and the frame is designed as a bumper 23. A respective articulated arm 24 is arranged at both sides in the interior of the coupling module 100 and serves to carry out of a deployment movement of the projecting roof 1 of the coupling module 100 to ultimately be able to place the bumper 23 at the outer skin of the aircraft body. The representation of the coupling module 100 furthermore shows the floor arrangement 2 which the passengers tread on directly after leaving the aircraft.

If the coupling module 100 pivots about the pivot axis 4, the floor arrangement 2 carries out a pivot movement about the pivot axis 4 that forms a kind of rocking movement. The projecting roof with the articulated arms 24 and a pendulum frame 10 at the rear side pivot along with the pivot movement.

Figure 2:
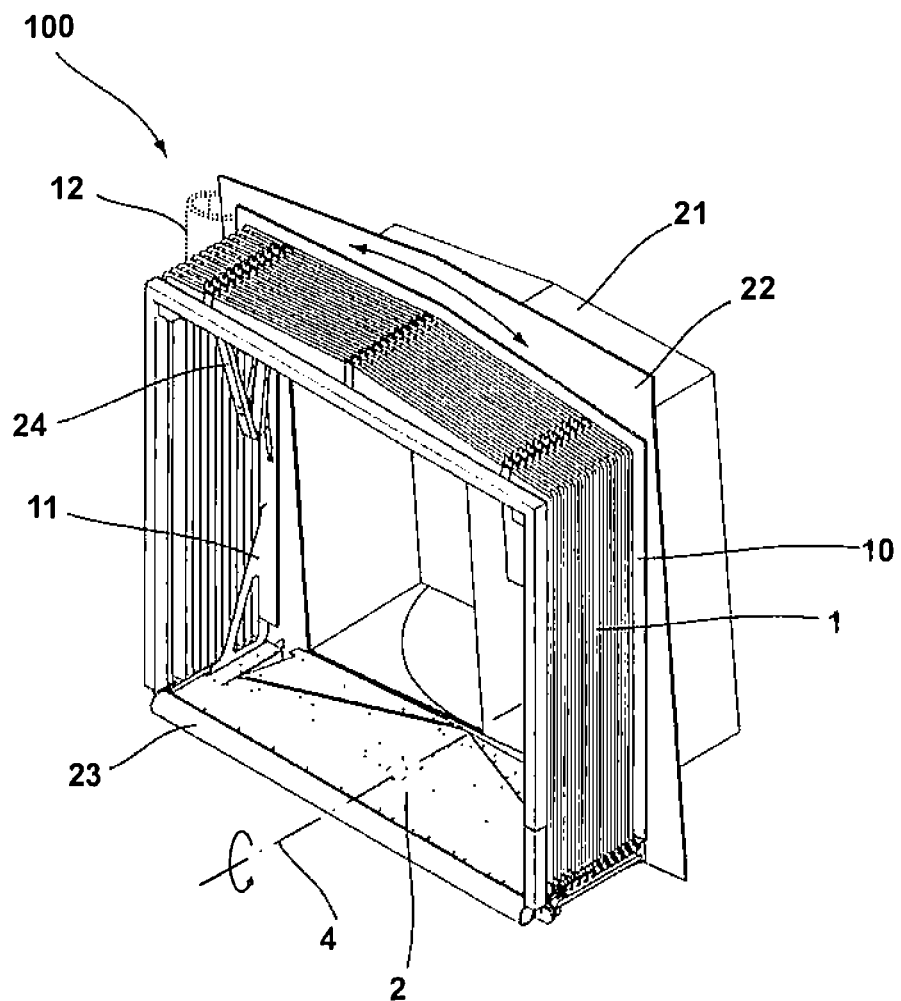
FIG. 2 is a detail view of a coupling module in an arrangement at a cabin of a passenger bridge.

FIG. 2 shows a detailed perspective view of the coupling module 100 in an arrangement at the cabin 21, wherein the coupling module 100 is already slightly pivoted about the pivot axis 4. This can be recognized by the fact that the pendulum frame 10 is rotated in front of the base frame 22 of the cabin 21.

The imaginary pivot axis 4 extends beneath the floor arrangement 2 of the coupling module 100 and a bumper 23, which is moved to or in front of the outer skin of the aircraft, is arranged at the front side at the floor arrangement 2.

Due to the perspective, one of the two lateral supporting frames 11 and one of the two articulated arms 24 can be recognized, with the projecting roof 1 being shown in the retracted state.

A surface body 12 in the form of a wave that, for example, forms part of a wave bellows is located between the base frame 22 and the pendulum frame 10. The pendulum frame 10 that moves along with the pivoting of the coupling module 100, shown by the double arrow, is arranged slightly spaced apart in front of the base frame 22. The surface body 12 here provides a sealing of the existing gap so that moisture or, for example, also wind, cannot enter into the passenger zone of the cabin 21.

Figure 3:
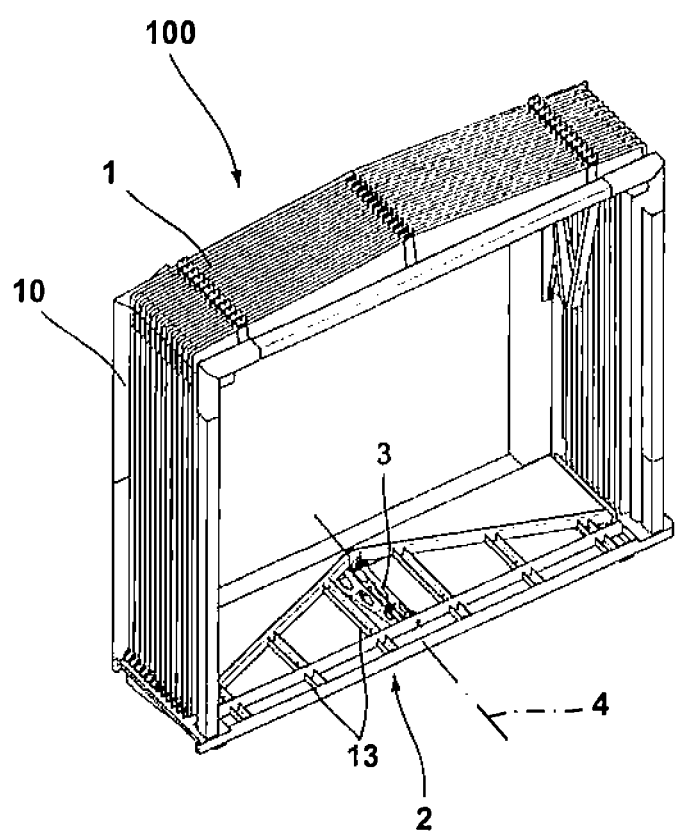
FIG. 3 is a further detail view of the coupling module having the features of the invention.

FIG. 3 shows the view of the coupling module 100, with the walkable zone of the floor arrangement 2 having been removed so that a floor frame 13 becomes visible. The support body 3 is located beneath the floor frame 13 and the floor frame 13 is connected to the support body 3 via articulated connections. The floor arrangement 2 with the floor frame 13 is thus received at the support body 3 and is pivotable about the pivot axis 4. The support body 3 can be rigidly arranged, in a manner not shown in any more detail, at the cabin or at a traveling gear of the passenger bridge and the support body 3 is dimensioned such that the weight of the coupling module 100 and a number of passengers can be received in the coupling module 100.

The pendulum frame 10 that substantially overspans the floor arrangement 2 with the projecting roof 1 is arranged at the rear side of the projecting roof 1, shown by way of example as a folding roof.

Figure 4:
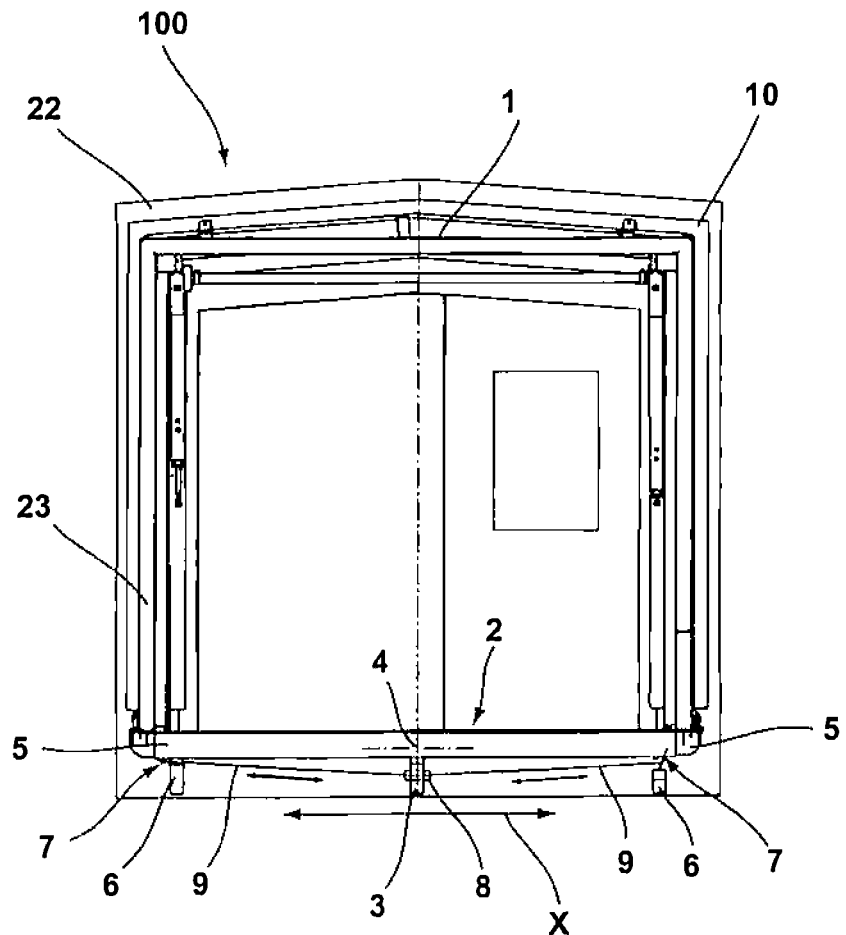
FIG. 4 is a front view of the coupling module in a state not pivoted relative to a base frame of the passenger bridge.
Figure 5:
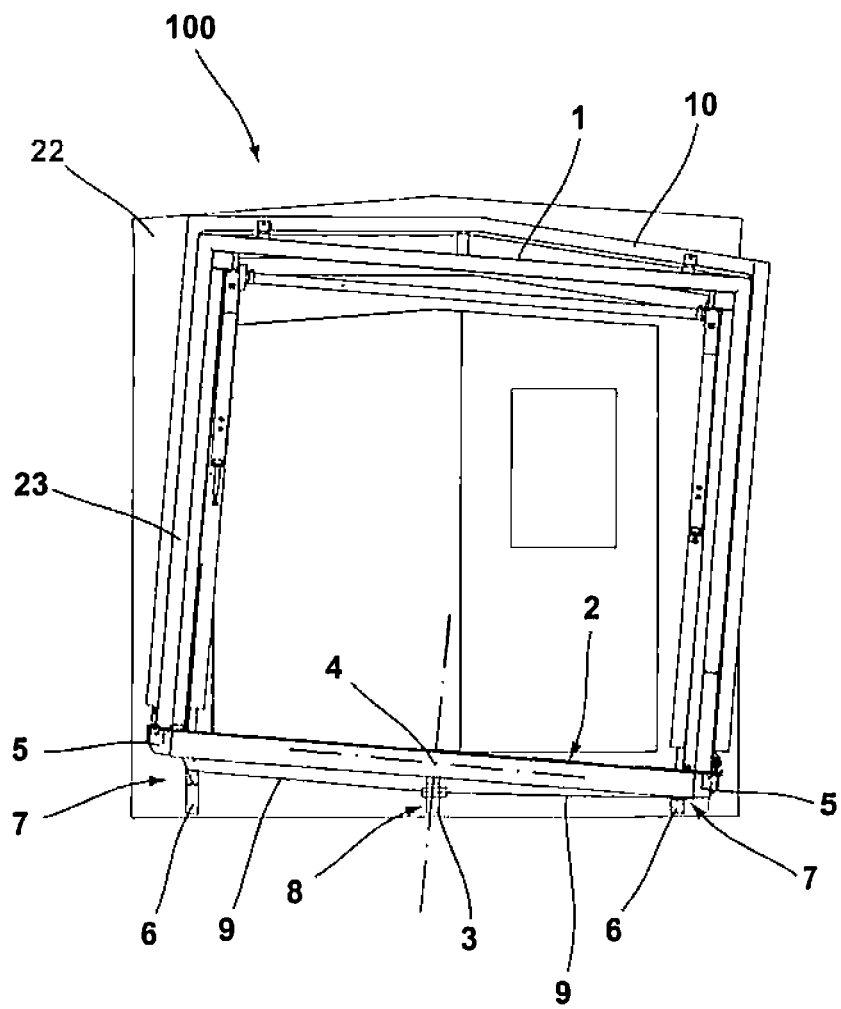
FIG. 5 is a front view of the coupling module of FIG. 4, with the coupling module being shown pivoted about the pivot axis relative to the base frame of the passenger bridge.

FIGS. 4 and 5 show respective views of the coupling module 100 in a non-rotated state (FIG. 4) and in a state rotated with respect to the base frame 22 (FIG. 5).

The coupling module 100 is shown with the floor arrangement 2 and with the projecting roof 1 that is held by the pendulum frame 10, and with the floor arrangement 2, the projecting roof 1 and the pendulum frame 10 forming a unit rotatable as a whole with respect to one another and substantially rigid.

The support body 3 is located beneath the floor arrangement 2 and the pivot axis 4 is in or beneath the floor arrangement 2. At the front side, the coupling module 100 terminates with the bumper 23.

The floor arrangement 2 has oppositely disposed outer end sides 5 in the transverse direction X, shown by a double arrow in FIG. 4, and end side supports 6 that are rigidly connected to the base frame 22 are located beneath the outer end sides 5.

Mechanical connection elements 7 are formed between the outer end sides 5 and the end side supports 6. They are coupled to coupling elements 9 that are connected to a common pivot drive 8.

If the pivot drive 8 is activated, a movement is initiated in the connection elements 7 via the coupling elements 9 such that the coupling module 100 can rotate about the pivot axis 4 in front of the base frame 22.

FIG. 4 shows the connection elements 7 in a non-activated state, with a movement being initiated in the connection elements 7 via the coupling elements 9 on an activation of the pivot drive 8 that results in a rotation of the coupling module 100 as shown by FIG. 5. The rotation of the coupling module 100 takes place about the pivot axis 4 that is formed in or beneath the floor arrangement 2. The pivot drive 8 can, for example, be activated in the opposite direction for a return movement of the rotation of the coupling module 100 to move the coupling module 100 into the horizontal position or into an opposite pivot direction.

The invention is not restricted in its design to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the invention both per se and also in the most varied combinations.

REFERENCE NUMERAL LIST

100 coupling module
1 projecting roof
2 floor arrangement
3 support body
4 pivot axis
5 outer end side
6 end side support
7 connection element
8 pivot drive
9 coupling element
10 pendulum frame
11 supporting frame
12 surface body
13 floor frame
20 passenger bridge
21 cabin
22 base frame
23 bumper
24 articulated arm
X transverse direction

The invention claimed is:

1. A coupling module for forming an interface between a cabin of a passenger bridge and an aircraft, comprising:
a floor arrangement having a walkable surface and outer end sides;
a projecting roof supported by the floor arrangement and overspanning the floor arrangement;
the floor arrangement and the projecting roof being pivotally supported about a common pivot axis defined beneath the walkable surface of the floor arrangement, the pivot axis extending horizontal and longitudinal to the coupling module;
a support body disposed beneath the floor arrangement, at least the floor arrangement and the projecting roof being at least indirectly supported by the support body, the support body being centrally arranged beneath the floor arrangement with respect to transverse direction (X), the pivot axis extending perpendicular to the transverse direction (X) and being arranged beneath a walkable surface of the floor arrangement;
the coupling module further comprising end side supports formed beneath the floor arrangement at the outer end sides of the floor arrangement disposed in the transverse direction; and at least one of the outer end sides of the floor arrangement being movably connected to the respective end side support.

2. A coupling module according to claim 1, wherein:
the floor arrangement and the projecting roof form a rocking arrangement by means of a central support of the support body such that when the floor arrangement pivots, a height of a first one of the outer end sides of the floor arrangement increases above a respective first one of the end side supports and a height of a second one of the outer end sides of the floor arrangement decreases above an oppositely disposed second one of the end side supports, and vice versa.

3. A coupling module according to claim 1, further comprising at least one mechanical connection element arranged between the outer end sides of the floor arrangement and the end side supports.

4. A coupling module according to claim 3, further comprising at least one pivot drive operable to control and/or actuate the at least one mechanical connection element between the outer end sides of the floor arrangement and the end side supports.

5. A coupling module according to claim 4, further comprising a respective coupling element formed between the pivot drive and each of the at least one mechanical connection elements.

6. A coupling module according to claim 5, wherein each coupling elements is push rod and/or a pull rod and/or a torsion rod.

7. A coupling module according to claim 4, wherein the at least one pivot drive is disposed centrally beneath the floor arrangement.

8. A coupling module according to claim 4, wherein the at least one pivot drive is disposed at the support body.

9. A coupling module according to claim 1, further comprising a pendulum frame supported on the floor arrangement, the projecting roof being supported by the pendulum frame.

10. A coupling module according to claim 9, further comprising at least one supporting frame supporting the pendulum frame on the floor arrangement such that the supporting frame rigidly connects the pendulum frame and the projecting roof on the floor arrangement.

11. A coupling module according to claim 9, further comprising at least one flexible surface body disposed in a region between the pendulum frame and a base frame.

* * * * *